(12) United States Patent
Klein et al.

(10) Patent No.: US 9,513,131 B2
(45) Date of Patent: Dec. 6, 2016

(54) USE OF THE OCCUPANCY RATE OF AREAS OR BUILDINGS TO SIMULATE THE FLOW OF PERSONS

(71) Applicants: Wolfram Klein, Neubiberg (DE); Hermann Georg Mayer, Prien am Chiemsee (DE); Oliver Zechlin, Zug (CH)

(72) Inventors: Wolfram Klein, Neubiberg (DE); Hermann Georg Mayer, Prien am Chiemsee (DE); Oliver Zechlin, Zug (CH)

(73) Assignee: Siemens Aktiengesellschaft, München (DE)

( * ) Notice: Subject to any disclaimer, the term of this patent is extended or adjusted under 35 U.S.C. 154(b) by 7 days.

(21) Appl. No.: 14/373,271

(22) PCT Filed: Dec. 13, 2012

(86) PCT No.: PCT/EP2012/075412
§ 371 (c)(1),
(2) Date: Nov. 19, 2014

(87) PCT Pub. No.: WO2013/107574
PCT Pub. Date: Jul. 25, 2013

(65) Prior Publication Data
US 2015/0066353 A1    Mar. 5, 2015

(30) Foreign Application Priority Data

Jan. 20, 2012 (DE) .......................... 10 2012 200 818

(51) Int. Cl.
*G01C 21/00* (2006.01)
*G01C 21/20* (2006.01)

(52) U.S. Cl.
CPC .................. *G01C 21/206* (2013.01)

(58) Field of Classification Search
CPC ............. G06K 7/10188; G06K 2017/0045; H04B 5/0062; H04L 63/0492; H04Q 2209/43; H04Q 2209/47; H04Q 9/00; H04W 12/02; H04W 12/08; H04W 48/16; H04W 88/02; H04W 8/26; H04W 4/028; H04W 4/043

USPC ........................................................ 701/408
See application file for complete search history.

(56) References Cited

U.S. PATENT DOCUMENTS 7,076,441 B2   7/2006   Hind et al.
7,579,945 B1   8/2009   Richter et al.
(Continued)

FOREIGN PATENT DOCUMENTS

CA   2700037 A1   3/2009
CN   101267643 A   9/2008
(Continued)

OTHER PUBLICATIONS

German Office Action dated Aug. 23, 2012 in corresponding German Patent Application No. DE 10 2012 200 818.7 with English translation.
(Continued)

*Primary Examiner* — Muhammad Shafi
(74) *Attorney, Agent, or Firm* — Lempia Summerfield Katz LLC

(57) ABSTRACT

Method and apparatus are described for calculating a route for at least one object inside a predefined area or building. A suitable sensor system is used to determine the current position data relating to the object. The respective current position data is used to simulate a flow of objects. Respective updated route guidance information is provided for output devices in the predefined area or building based on the results of the object flow simulation. The current position data relating to the object are determined via the effects of near field communication (NFC), for example, via RFID technology.

20 Claims, 3 Drawing Sheets

(56) References Cited

U.S. PATENT DOCUMENTS

| | | | |
|---|---|---|---|
| 9,109,896 B2 | 8/2015 | Banaszuk et al. | |
| 2004/0212500 A1* | 10/2004 | Stilp | G08B 19/005 |
| | | | 340/541 |
| 2007/0159332 A1 | 7/2007 | Koblasz | |
| 2009/0326879 A1* | 12/2009 | Hamann | G06F 1/206 |
| | | | 703/2 |
| 2010/0045441 A1* | 2/2010 | Hirsch | H04B 5/0012 |
| | | | 340/10.1 |
| 2010/0204969 A1 | 8/2010 | Hariharan et al. | |
| 2010/0299116 A1* | 11/2010 | Tomastik | G06K 9/00771 |
| | | | 703/2 |
| 2012/0276517 A1 | 11/2012 | Banaszuk et al. | |

FOREIGN PATENT DOCUMENTS

| | | |
|---|---|---|
| CN | 101281657 A | 10/2008 |
| CN | 101465057 A | 6/2009 |
| CN | 101561836 A | 10/2009 |
| CN | 101868798 A | 10/2010 |
| CN | 101941648 A | 1/2011 |
| DE | 102009059892 | 6/2011 |
| JP | 2006201961 A | 8/2006 |
| JP | 2010-205112 | 9/2010 |
| KR | 10-2011-0119388 | 11/2011 |
| WO | 2009038563 | 3/2009 |
| WO | WO-2009-038563 * | 3/2009 |

OTHER PUBLICATIONS

International Search Report and Written Opinion in PCT/EP2012/075412, dated Mar. 1, 2013, 23 pages, with English translation.

Robert Tomastik et al., "Video-Based Estimation of Building Occupancy During Emergency Egress", 2008 American Control Conference, Jun. 11-13, 2008, pp. 894-901.

Chinese Office action for related Chinese Application No. 201280067479.X, dated Dec. 17, 2015 with English Translation.

Japanese Office Action for related Japanese Application No. 2014-552543, mailed Jul. 6, 2015, with English Translation.

* cited by examiner

USE OF THE OCCUPANCY RATE OF AREAS OR BUILDINGS TO SIMULATE THE FLOW OF PERSONS

The present patent document is a §371 nationalization of PCT Application Serial Number PCT/EP 2012/075412, filed Dec. 13, 2012, designating the United States, which is hereby incorporated by reference in its entirety. This patent document also claims the benefit of DE 10 2012 200 818.7, filed on Jan. 20, 2012, which is also hereby incorporated by reference in its entirety.

FIELD

The present embodiments relate to calculating a route for an object within a predefined area or building. The present embodiments further relate to detecting situations hazardous to persons within a predefined area or building.

BACKGROUND

Simulations of flows of persons and route calculations for objects are playing a greater role in infrastructure planning. Such simulations are also useful in performing an evacuation of persons from areas or buildings.

The occupancy of rooms or buildings are determined using video systems or radio frequency identification (RFID) technology. In, for example, U.S. Pat. No. 7,076,441, the primary focus is on the optimization of the energy consumption or the well-being of users of the room. Thus, for example, workplace illumination may be adapted to individual needs or may be automatically switched off when the workplace is left. In another scenario, the occupancy information is included in the regulation of the heating or air conditioning equipment. In addition, many systems with which persons or objects may be counted or identified at specific waypoints exist, including, e.g., conventional entry monitoring systems or goods security systems.

SUMMARY AND DESCRIPTION

The present embodiments may obviate one or more of the drawbacks or limitations in the related art. For example, a method and an apparatus are provided for calculating a route appropriate for a current situation for an object within a predefined area or building. A method is provided for calculating a route for at least one object within a predefined area or building. A sensor system determines current position data of the object. The respective current position data is used for a simulation of the flow of objects. Based on the results of the simulation of the flow of objects, respective updated route guidance information is made available for output devices in the predefined area or building. Through a simulation of the flow of objects, the movement of objects, e.g., people, is represented as realistically as possible, in order, for example, to derive conclusions regarding the evacuation of the people from properties (e.g. buildings).

Because the position information acts as the initial basis for a simulation of the flow of objects, a dedicated route may be calculated in a dedicated manner for the object. For example, the dedicated route may indicate how the object (e.g., people or vehicles) may reach the nearest emergency exit as quickly as possible from their current location. In this way, for example, an effective evacuation of a predefined area or building may proceed. Escape route signs for specific objects or object groups may be displayed on output devices (e.g., screens or display panels) in the area or in the building.

Furthermore, technical control systems may transmit specific, dedicated and coordinated route information to fleeing people in a hazardous situation. The route information may be transmitted to a person's mobile device. The mobile device (e.g. smartphone, PDA) may be unambiguously associated with one person, e.g., through prior registration of the person with the control system over the Internet or when entering the area or building.

For the simulation of the flow of objects, an emission diffusion from a source of danger in the predefined area or building is also used. The movement behavior of people is also subject to dynamic influences caused, for example, by emissions of various kinds. In this way a direct coupling is established between a simulation of the flow of objects, e.g., a simulation of the flow of persons, and an emission diffusion model. The emission diffusion parameters for the simulation of a diffusing hazard are derived from the measured values (e.g., temperature distribution, airflows) supplied by the sensors. The diffusion of the emissions may, for example, be calculated continuously. A continuously calculated emission diffusion is coupled with a discrete model of flows of people or objects. At each time interval the emission diffusion model is discretized in order to accept the values, while the diffusion of the emissions is calculated continuously in the emission diffusion model itself. A Fast Marching algorithm may, for example, be used for an efficient calculation of the simulation model. The calculation may, for example, be performed on a personal computer with appropriate software.

In one embodiment, the current position data of the object is determined by near field communication (NFC). In a near field communication (NFC) the data exchange is implemented over short distances (e.g., a few centimeters). A reliable association, e.g., a peer-to-peer association, between transmitter and receiver may be achieved in a simple manner.

In one embodiment, RFID technology is used as the sensor system. An RFID transponder is connected reliably with the object. The antenna of the RFID reader is mounted in the predefined area or building. The determination of the occupancy of the building or area (e.g., by people) at a respective point in time may, e.g., be achieved through the integration of RFID antennas in the floor or in paving slabs.

The antenna includes a metal coil that may be manufactured economically. An antenna coil capable of full functionality is incorporated into every paving slab. A plurality of paving slabs may be combined to form an antenna matrix. The RFID controller may then activate and evaluate the various elements of the matrix sequentially. The position of the corresponding element is stored in the RFID controller. As a result, when a particular ID from a respective antenna element is recognized, the RFID controller may unambiguously determine the location of the associated object or the associated person in the space. The RFID transponder (RFID tag) is associated as reliably as possible with the object to be identified or with the person to be identified. In one example, a fixed assignment of the transponder to persons is established by attaching the transponder in the sole of a shoe or in another footwear location. This assignment may be useful in safety-critical areas in which prescribed footwear is worn as part of a uniform or other work clothing (e.g., in laboratory environments, power stations, hospitals etc.). Attachment to the shoe may also be useful because relatively economical passive RFID transponders, which are only effective at close range, may be used. By limiting effectiveness to a close range, an unambiguous assignment to the active antenna element may be attained. As soon as people are detected in an area to be monitored, the position information may be used, e.g., as the initial basis for a simulation of the flow of people. The simulation may thus be used to calculate how each respective person may reach the nearest emergency exit as quickly as possible from a current location (effective evacuation control).

In one embodiment, the sensor system includes a network of sensors for determination of the direction of movement of the object. The direction of movement of the object is also used for the simulation of the flow of objects. For example, a plurality of paving slabs may be combined to form an antenna matrix. The RFID controller may then activate and evaluate the various elements of the matrix sequentially. Thus movement patterns and directions of movement may easily be detected for a person or an object, and may be used for the simulation of the flow of objects in order to calculate a dedicated route guidance for the corresponding object. Similarly, a plurality of video cameras may be connected in a sensor network such that the positions of persons may be tracked throughout the whole area.

The emissions include, for example, heat emissions or emissions of pollutants or of smoke that are generated by a source of emissions or by a fire source. The emissions may affect an observed flow of persons through direct contact, for example, in that persons are injured by the emissions, or may affect the observed flow of persons indirectly, because the emissions change or affect the speed at which the persons move. People tend, for example, to crawl under the smoke-affected area of a building. As a result of the limited view and the crawling, the speed of movement of the people becomes slower. A flow of people may also be affected indirectly through possible emissions, in that persons attempt to avoid the affected region within the area by selecting alternative escape paths or routes, or adapt their behavior appropriately to the situation, e.g., increasing their speed of movement when fleeing from the emissions. People may also affect the degree or the speed of diffusion of the emissions, in that, for example, the people open doors or windows in a building and so, for example, affect the diffusion of the emissions through a changed airflow. In some cases the effect of extinguishing measures performed by the people present may be included in the model.

In one embodiment, the route guidance information is provided in a dedicated manner for an object or for a group of objects, based on the respective position data. In this way, for example, a person or a group of people may be guided in a targeted manner, depending on their respective position, to an emergency exit, also taking the positions of other, third persons into account. An orderly total evacuation may be achieved as a result.

In one embodiment, the route guidance information is provided in a dedicated manner for an object or for a group of objects, based on object-related data. Object-related data or information, such as the state of health of a person (injured person, unconscious person), may be recognized, for example, via camera monitoring or emergency alarms, at a control center, and used for the calculation of the route guidance information.

In one embodiment, an object is registered by a monitoring camera, and a current position of the object is determined via video analysis. Although tracking the personal information is more technically difficult in this case, the method nevertheless may be useful in economically retro-fitting the method to existing infrastructure. In some cases, the results from the video evaluation may be compared and combined with the results registered via other technologies.

In one embodiment, an apparatus calculates a route for at least one object within a predefined area or building. The apparatus includes a suitable sensor system installed in the area or building for determining the current position data of the object, and a computing unit to perform a simulation of the flow of objects located in the area or building. The respective current position data and an emission diffusion of a source of danger in the predetermined area or building are used for the simulation of the flow of objects. The apparatus further includes an output device to output respective updated route guidance information based on the results of the simulation of the flow of objects. The apparatus may be built with conventional hardware and software components. Conventional RFID sensors or a camera system with person detection (video analysis) may, for example, be used as the sensor system. A personal computer (with processor, input/output means and (wired or wireless) communication components) may be used as the computing unit. The simulation of the flow of objects or persons is implemented on the computing unit by a suitable simulation program. Monitors, display panels, LCD displays with scrolling text and other output devices may be used to output the route guidance information. Optional actuators for securing and/or accelerating the evacuation of persons may also be operated. The actuators may be actuators for operating doors, windows, staircases or other items. For example, the actuators may also include apparatus for actively containing the respective event, for example, a water sprinkling installation or other apparatus.

The method and apparatus are not limited to data that originates from video analysis or RFID evaluation. The position data for the people may be obtained with other technologies, including, for example, via pressure-sensitive paving slabs, laser scanners or light barriers.

DETAILED DESCRIPTION

Figure 1:
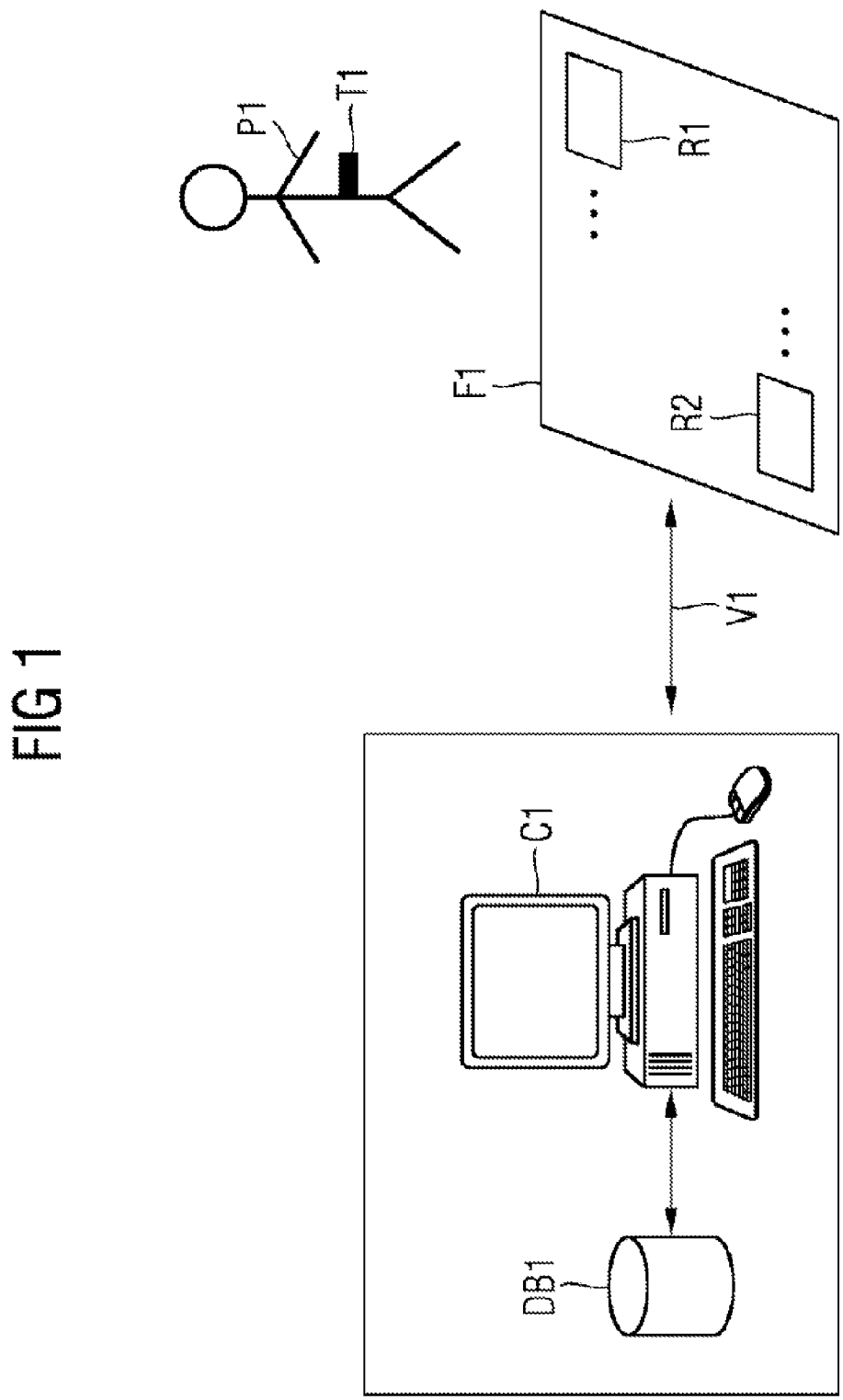
FIG. 1 shows a schematic illustration of an apparatus in accordance with one embodiment.

FIG. 1 shows an exemplary illustration of the principle of one embodiment for determining the occupancy of the building or area. The determination of the occupancy of the building or area with a person (or people) P1 at a respective point in time is achieved, for example, through the integration of RFID antennas R1, R2 in the floor F1 (for determining an occupancy of a building) or in paving slabs (for determining an occupancy of an area). Each antenna R1, R2 primarily includes a metal coil that may be manufactured economically. An antenna coil capable of full functionality is incorporated into every paving slab F1. A plurality of paving slabs may be combined to form an antenna matrix (see FIG. 4). The RFID controller may then activate and evaluate various elements of the matrix sequentially. The position of the corresponding element is stored in the RFID controller. When a particular ID from a particular antenna element R1, R2 is recognized, the RFID controller may unambiguously determine the location of the associated object or the associated person P1 in the space. One RFID controller may, for example, monitor a plurality of RFID readers, and initiate the communication of the detected position data to a control center.

The RFID transponder (RFID tag) T1 is associated reliably (e.g., as reliably as possible) with the object to be identified (e.g. a vehicle or a driverless transport system in a factory) or with the person P1 to be identified. For a fixed assignment of the transponder T1 to person P1, for example, the transponder may be attached in the sole of the shoe or somewhere else on the footwear (see FIG. 3). This attachment may be useful in safety-critical areas where footwear is prescribed as part of a uniform or other work clothing (e.g., in laboratory environments, power stations, hospitals, and other working environments). Attachment to the shoe is also useful in that relatively economical passive RFID transponders may be used. Passive RFID transponders are only effective at close range. By limiting effectiveness to a close range, an unambiguous assignment to the active antenna element (FIG. 4; AE) may also be attained. As soon as the person or people P1 are detected in the area to be monitored, the position information may be used, e.g., as the initial basis for a simulation of the flow of objects, or a simulation of the flow of people. The manner in which the respective people P1 may reach the nearest emergency exit as quickly as possible from their current location may thus be calculated (see FIG. 2). Through the accurate localization of an object or person P1 through the simulation of the flow of objects or the simulation of the flow of persons, dedicated route information for the corresponding object or for the corresponding person may be calculated. Through the communication of this dedicated route information for the corresponding object or for the corresponding person, an effective evacuation, adapted to the behavior (e.g. whereabouts, direction of movement) of other persons or objects in the building or in the area may, for example, be implemented. An optimum evacuation route for a single person may in this way be calculated. An optimum total evacuation, taking all of the people or objects in a building or area into account, may also be calculated.

RFID tags may be carried on the body or, for example, integrated into the boarding pass, the personal identity card, a company ID or a visitor ID. RFID may be useful in that identifiers (personal identity card, company ID, or other identifiers) typically used for identifying persons P1 may be used. Active tags or passive tags may be used. Passive tags are inexpensive, and may be manufactured in large numbers as disposable products. Active tags are more expensive, although active tags do not require any manual contact between the card and the infrastructure, and allow greater distances from the RFID readers. Both active and passive RFID tags use card reader devices R1, R2 which are positioned at strategically favorable places in the building or area.

In one exemplary application scenario, a person P1 registers with a control system LS1, either in advance over the Internet, or upon entry to the building or area. When the person P1 registers, unique identification information (ID) is assigned to the person P1. The identification information (ID) is uniquely associated with an RFID tag T1 that is reliably linked to the person. The RFID tag T1 may, for example, be carried on an item of the person's clothing (e.g., with pin or clip technology), or may also be integrated into items of clothing. The association between the identification information and the person P1 may also, however, be achieved through, for example, an ID card (e.g., a personal identity card, company ID, travel ticket, boarding pass). The control system LS 1 for registering the person P1 includes a computer system C1 (e.g. personal computer, workstation) to electronically register the person P1 and to store person-specific data. The control system LS1 further includes a database DB1, which may store the data supplied by the sensor system (RFID reader, RFID controller) and may store parameters or data for the simulation of flows of objects or the simulation of flows of people.

When the person P1 now enters the corresponding building or area with the assigned information, the sensors R2, R3 (e.g., RFID readers) integrated into the floor covering F1 determine the location of the person P1 in the building or area. The control system LS1 is connected via a data connection V1 to the sensors R1, R2. A wireless connection V1 (e.g., WLAN, radio, infrared) is advantageous, because the wireless connection simplifies the installation and servicing of the apparatus.

Figure 2:
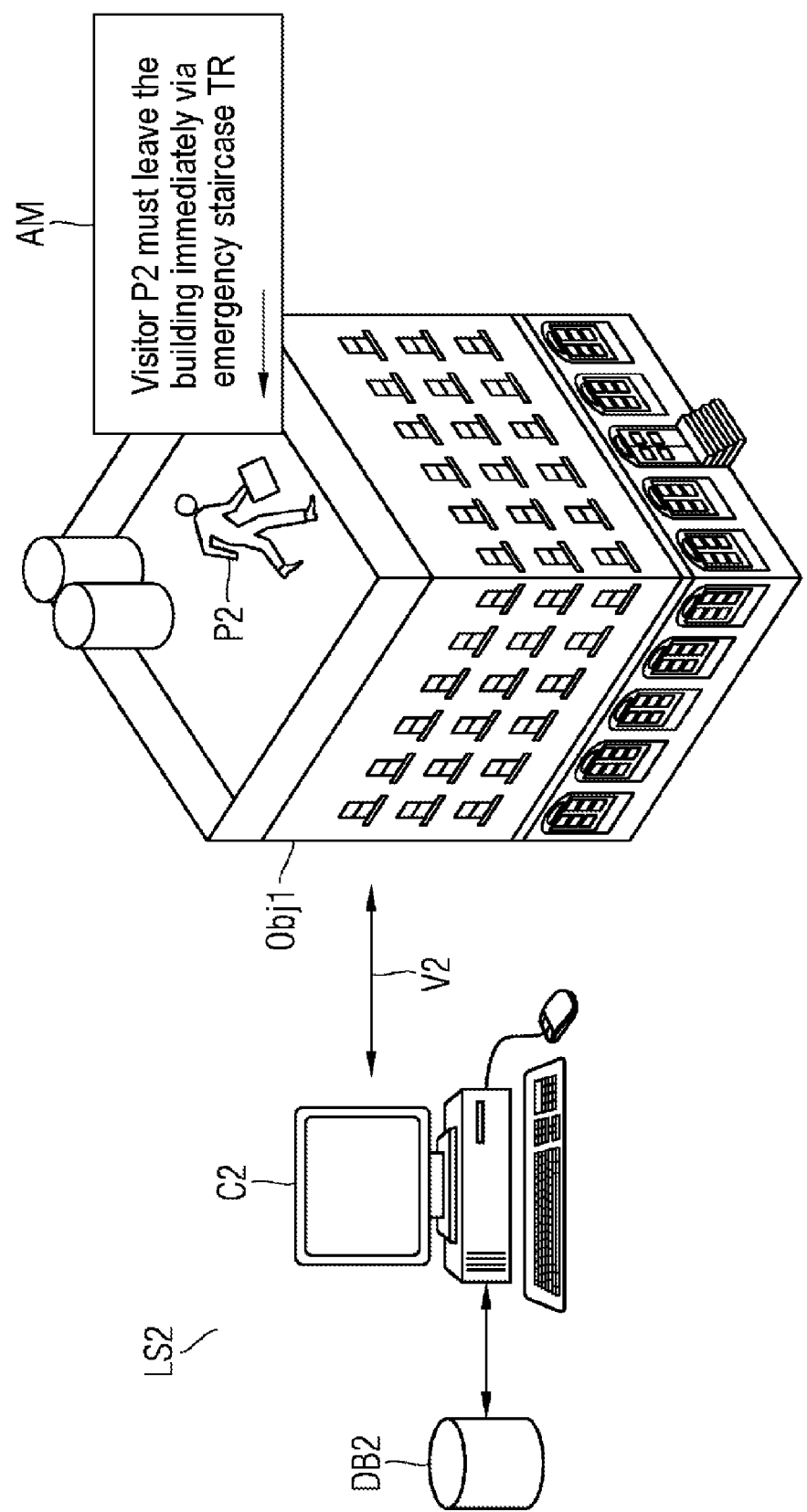
FIG. 2 shows another schematic illustration of an apparatus having an output medium via which exemplary instructions that refer to a person are provided in accordance with one embodiment.

FIG. 2 shows a second exemplary illustration of the principle of one embodiment with exemplary instructions related to a person (or people) on an output medium AM (e.g., "Visitor P2 must immediately leave the building via emergency staircase TR"). The output medium AM may, for example, be a display panel in the building Obj1 or area, or also may be loudspeakers mounted in the building Obj1 or area. A mixture or a juxtaposition of different output media AM may also be used. An RFID transponder is reliably assigned to the person P2 and is reliably attached to the person P2. The control system LS2 is continuously informed via the data connection V2 by the sensor system mounted in the building Obj1 about where the person or people P2 are located in the building Obj1. The computer system C2 of the control center LS2 performs a simulation of a flow of persons based on the location of the people P2 in the building Obj1 supplied by the sensor system. The computer system C2 also determines respective person-specific routes, and outputs this route information on the output media AM perceptible to the respective person P2 and in a dedicated manner to the respective person P2.

As already explained above, when the person P2 registers, unique identification information (ID) is assigned to the person P2. The identification information (ID) is uniquely associated with an RFID tag that is reliably associated with the person P2. The location of the output media AM in the building Obj1 or in the area is also stored in the control system LS2.

By consulting this information in the computer system C2, person-specific route information may be provided (or outputted) for a respective person P2 on the output medium AM. The person-specific route information is perceptible at the time to the person P2, and may also include appropriate graphical instructions (e.g. a direction arrow).

The person-specific route information for a person P2 may also be provided (or outputted) on a mobile device (e.g., a mobile phone, PDA, smartphone, audio guide) assigned to the person P2. For this purpose, a unique assignment of the mobile device to a specific person P2 is stored in the control center LS2. The assignment may, for example, be stored when the visitor P2 registers on entering the building Obj1. This data may also be stored in the database DB2. The mobile device may already be in the possession of the visitor P2. The mobile device may also be in the possession of the building (e.g., museum), and be given to the visitor P2 upon entering the building Obj1 (e.g., as an audio guide).

While RFID technology is suitable as the sensor system, another type of sensor system (e.g., video monitoring, Bluetooth) may be used or combined with RFID technology.

Suitable pattern detection software permits the evaluation of video monitoring and the recognition of exceptional situations (e.g., accident or panic behavior) with respect to a person or group of people. This information may be used as an input parameter to the simulation of the flow of people.

The control center LS2 includes one or more computers C2 (e.g., PC, workstation) with suitable storage media DB2 for the performance of the simulations of the flow of objects (for the people P2 located in the building Obj1) and for simulating the diffusion of emissions from a source of danger (e.g., fire).

In one embodiment, the emission diffusion parameters, for example, flow parameters, are detected by sensors and reported to the control center LS2. Emission diffusion parameters, for example, material parameters or building parameters, may also be read from the database DB. The movement of the persons P2 within the building Obj1 is calculated depending on an object flow model and an emission diffusion model by a computer C2 of the control center LS2. The computer C2 may read the object flow model or the person flow model as well as the emission diffusion model from the database DB2 when a hazardous situation occurs. Various types of emission diffusion models may be stored in the database DB2 for different types of hazardous situations. For example, in case of fire, a different emission diffusion model is loaded by the computer C2 from the database DB2 from when, for example, water enters a room.

Figure 3:
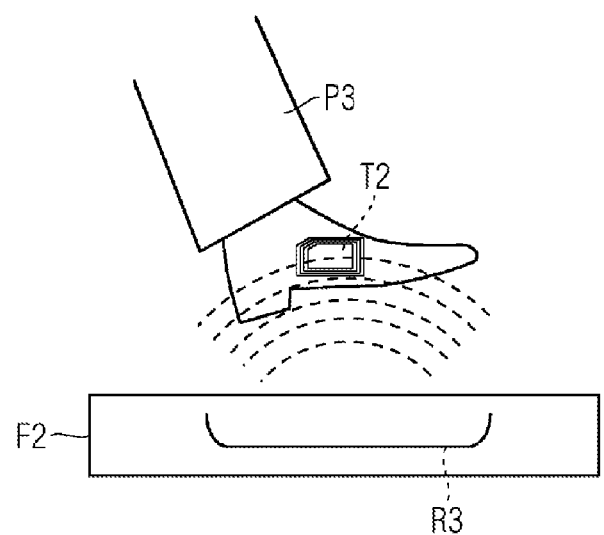
FIG. 3 shows an example of a secure attachment of an RFID transponder to a person.

FIG. 3 shows an example of the secure attachment of an RFID transponder T2 in a shoe of a person P3. An RFID reader R3 is integrated into a paving slab F2, and is activated when the RFID transponder T2 nears the reception area of the RFID reader R3 in the paving slab F2. The RFID reader R3 is activated when the person P3 steps on the paving slab F2 with the shoe in which the RFID transponder T2 is integrated.

This embodiment may be useful in safety-critical areas in which prescribed footwear is worn as part of a uniform or other work clothing (e.g., in laboratory environments, power stations, hospitals, or other work environments). Attachment to the shoe may also be useful in that relatively economical passive RFID transponders, which are only effective at close range, may be used. By limiting the effectiveness to a close range, an unambiguous assignment to the active antenna element (FIG. 4; AE) may also be attained.

Figure 4:
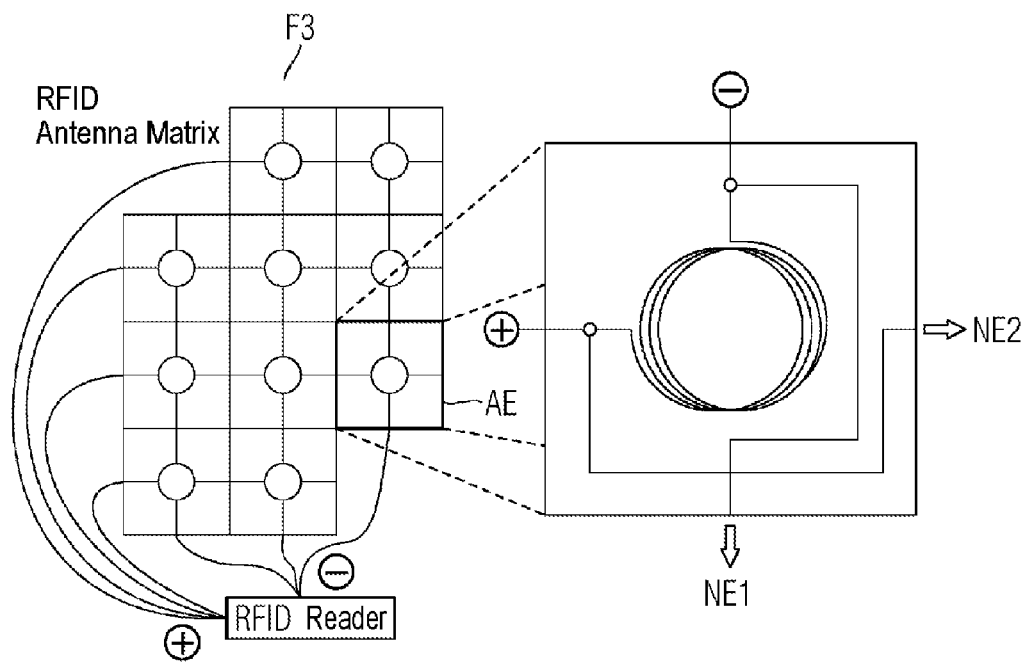
FIG. 4 shows an exemplary floor covering including a matrix of RFID antennas.

The left-hand part of FIG. 4 shows an exemplary floor covering F3, including a matrix of RFID antennas. The antenna of an RFID reader may be integrated directly into the floor F3. Due to their modular construction, paving slabs may economically be equipped with the RFID technology and connected to a network of sensors. In addition, existing infrastructure can relatively easily be retrofitted. Equipping the entire area of the floor with close-range RFID receivers opens up a large number of potential applications that may be used for dedicated route planning or evacuation optimization. The element AE of the RFID antenna matrix (third column from the left, third line from the top) is an active element AE, and outlined with a heavy line. The element AE detects a transponder in its antenna reception region. As a result, the position of a person equipped with the detected transponder may be determined via the RFID reader (bottom left of FIG. 4). The transponder may, for example, be integrated into the person's shoe.

The element AE of the section of floor F3 is illustrated in more detail in the right-hand part of FIG. 4. A spiral or circular antenna is arranged in the center. The RFID reader detects its activation, and passes this information on to the control center. The element AE is adjacent in the southern direction (i.e., downward in FIG. 4) to the element NE1, and in the eastern direction (i.e., to the right in FIG. 4) to the element NE2.

The disclosed embodiments solve the problem of establishing the location of people or objects disposed in a building at a certain moment in time. The disclosed embodiments are suitable for application in safety-critical areas. The method is also suitable for conventional optimization solutions, e.g., for saving energy or for the regulation of the room temperature. In safety-critical application areas, the disclosed embodiments are useful in the following scenarios:

a) Simulating escape routes with the help of "occupancy detection": The method may, among other things, establish the whereabouts of persons in a building. Based on this information, a simulation of the flow of people may calculate the optimum escape route individually for each person (or specific groups of people). The escape route calculated in this way may then be displayed in a suitable manner (e.g., dynamic escape route signage, mobile telephone, workplace computer, and other displays). The method permits optionally, among other things, an identification of individual persons. This is advantageous in those cases in which, in addition to the position, other person-specific properties are to be included in the simulation of the flow of people (e.g., walking disability, persons who are blind or deaf and require the alarm to be raised and the escape route to be demonstrated in a special form).

b) Detecting floor contacts: This form of monitoring is suitable for all scenarios in which, under normal conditions, no contact between the floor and particular objects or particular parts of persons' bodies is desired. In a hazardous working environment, an alarm may be triggered when a person has fallen unconscious to the floor. Limiting the effectiveness of the sensor system to the near range may be used in this scenario. This may make use of the fact that most of the human body is located above the reception range of the RFID antennas built into the floor. As a result, transponders carried on the body are not detected by the RFID reader under normal conditions. Only when the person falls to the floor, e.g., as a result of fainting, is the transponder detected and the alarm given. The place of the accident may be reliably located through the good spatial resolution of the apparatus. In addition to industrial applications, if the antenna elements are manufactured sufficiently economically, the monitoring may be applied in domestic areas, e.g., for looking after those in need of care. In these scenarios, the transponder is deliberately worn by the person at a place suitable for the purpose of the particular application, so that under normal conditions reception by the reader does not occur.

c) Identifying objects or persons: Objects that have been placed on the ground may be identified in order to distinguish the objects from potentially dangerous objects that have to be examined more closely in order to clarify the situation. The object may be associated with an owner. One example may involve items of baggage that have been put down in airports or railway stations, which may be used as carriers for explosive devices. A reduction in false alarms may lead to significant cost savings in this field.

In this scenario, transponders associated with identification characteristics that are carried temporarily such as entry tickets, flight tickets or baggage labels are useful. These identification characteristics are either assigned to the objects as a result of the processes involved (e.g., baggage handling at airports), or may be distributed as an action on the part of the organizer (e.g., baggage labels at exhibitions). If a correspondingly identified baggage item is placed down or forgotten in the monitored area, an easy localization and identification of the baggage item may be performed. An expensive examination of the object for hazardous substance is then, as a rule, not necessary. As a result of the antennas in the floor, it is not necessary for anybody to approach the baggage item to examine or record it.

A method and apparatus for calculating a route for at least one object within a predefined area or building is provided. A suitable sensor system determines the current position data of the object. The respective current position data is used for a simulation of the flow of objects. Based on the results of the simulation of the flow of objects, respective updated route guidance information is made available for output devices in the predefined area or building. The current position data for the object may be determined via the effects of near field communication (NFC), for example, via RFID technology.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for calculating a route for at least one object within a predefined area or building, the method comprising:
    determining, with a sensor system, data indicative of a current position of the at least one object;
    simulating, by a computing unit, a flow of objects based on the data indicative of the current position of the at least one object within the predefined area or the building and an emission diffusion from a source of danger in the predefined area or the building;
    generating, by the computing unit, based on the simulated flow of objects, route guidance information for output in the predefined area or the building; and
    outputting, by the computing unit, the route guidance information to an output device.

2. The method of claim 1, wherein determining the current position comprises determining the current position via near field communication (NFC).

3. The method of claim 2, wherein the sensor system comprises a radio frequency identification (RFID) transponder connected with the at least one object and an RFID reader comprising an antenna mounted in the predefined area or the building.

4. The method of claim 1, wherein the sensor system comprises a radio frequency identification (RFID) transponder connected with the at least one object and an RFID reader comprising an antenna mounted in the predefined area or the building.

5. The method of claim 4, further comprising determining, with a network of sensors of the sensor system, a direction of movement of the at least one object, and wherein simulating the flow of objects is further based on the direction of movement of the object.

6. The method of claim 1, further comprising determining, with a network of sensors of the sensor system, a direction of movement of the at least one object, and wherein simulating the flow of objects is further based on the direction of movement of the object.

7. The method of claim 1, wherein generating the route guidance information comprises providing the route guidance information for each object of the at least one object based on the respective current position of each object.

8. The method of claim 7, wherein generating the route guidance information comprises providing the route guidance information for each object of the at least one object based on object-related data.

9. The method of claim 1, further comprising registering the at least one object by a monitoring camera, and wherein determining the data indicative of the current position comprises determining the data indicative of the current position via video analysis.

10. The method of claim 1, wherein the output device is at least one mobile device.

11. The method of claim 10, wherein the at least one mobile device is a mobile phone, smartphone, personal digital assistant (PDA), or audio guide.

12. the method of claim 10, wherein each mobile device of the at least one mobile device is uniquely assigned to each respective object of the at least one object within the predefined area of the building.

13. The method of claim 1, wherein the output device is a workplace computer, display panel, or speaker.

14. A system for calculating a route for at least one object within a predefined area or building, the system comprising:
    a sensor system installed in the predetermined area or the building and configured to determine data indicative of a current position of the object;
    a computing unit configured to:
        perform a simulation of a flow of objects located in the predefined area or the building, wherein the simulation is based on the data indicative of the current position of the at least one object within the predefined area or the building and an emission diffusion of a source of danger in the predefined area or the building; and
        output respective updated route guidance information to a respective output device based on the results of the simulation of the flow of objects.

15. The system of claim 14, wherein the sensor system is configured for near field communication (NFC).

16. The system of claim 14, wherein the sensor system comprises a radio frequency identification (RFID) transponder connected with the at least one object and an RFID reader comprising an antenna mounted in the predefined area or the building.

17. The system of claim 14, wherein the output device is at least one mobile device.

18. The system of claim 17, wherein the at least one mobile device is a mobile phone, smartphone, personal digital assistant (PDA), or audio guide.

19. The system of claim 17, wherein each mobile device of the at least one mobile device is uniquely assigned to each respective object of the at least one object within the predefined area or the building.

20. The system of claim 14, wherein the output device is a workplace computer, display panel, or speaker.

* * * * *